M. W. MORRIS.
GUIDE FOR VEHICLE SPRINGS.
APPLICATION FILED JULY 31, 1914.
1,135,832.
Patented Apr. 13, 1915.
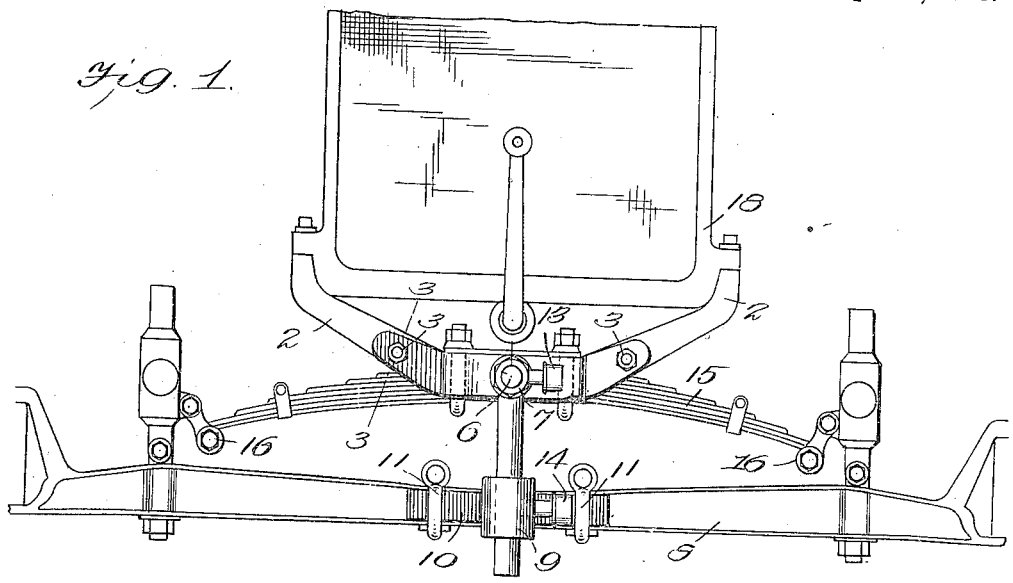
WITNESSES
F. C. Barry
L. A. Stanley
INVENTOR
Milo W. Morris
BY Munn & Co.
ATTORNEYS

UNITED STATES PATENT OFFICE.

MILO WARD MORRIS, OF OLYMPIA, WASHINGTON.

GUIDE FOR VEHICLE-SPRINGS.

1,135,832.

Specification of Letters Patent.

Patented Apr. 13, 1915.

Application filed July 31, 1914. Serial No. 854,297.

*To all whom it may concern:*

Be it known that I, MILO W. MORRIS, a citizen of the United States, and a resident of Olympia, in the county of Thurston and State of Washington, have made certain new and useful Improvements in Guides for Vehicle-Springs, of which the following is a specification.

My invention relates to improvements in guides for vehicle springs, and it consists in the combinations, constructions, and arrangements herein described and claimed.

An object of my invention is to provide a guide for springs of light automobiles such as those in which the springs are disposed transversely of the car.

A further object of my invention is to provide a device of the type described in which the swaying of the body of the vehicle due to the endwise movement of the springs is eliminated, thereby lessening the movement of the body when going over rough roads and also rendering steering much easier.

A further object of my invention is to provide a device which may be readily attached to or removed from cars of the type described without necessitating the dismantling of the parts or of weakening or in any way interfering with them.

Other objects and advantages will appear in the following specification and the novel features of the device will be particularly pointed out in the appended claims.

My invention is illustrated in the accompanying drawings forming part of this application in which—

Figure 1 is a front view of a car showing my improved spring guide in place, Fig. 2 is a section along the line 2—2 of Fig. 1, Fig. 3 is a section along the line 3—3 of Fig. 1, and Fig. 4 is a perspective view of a bracket for the pivot bolt.

In carrying out my invention I provide a plate or bracket 1 which may be secured to the frame 2 of a car by means of bolts 3. A bolt or stud 4 is secured to the plate 1 and is provided with a reduced portion 5 having a threaded end 6 arranged to receive a nut 7.

Secured to the axle 8 of the car is a guide member comprising a portion 9 having a cylindrical bore and an integral plate or bar 10 arranged to be clamped to the axle by means of clamping members 11 of the type shown in the drawings. Arranged to slide in the cylindrical bore in the member 9 is a guide arm 12 whose upper end is pivotally suspended from the reduced portion 5 of the pivot bolt 4. Grease cups 13 and 14 may be provided for the upper and lower wearing parts of the guide member 12.

From the foregoing description of the various parts of the device the operation thereof may be readily understood.

In cars of the type described the springs 15 are generally suspended from shackles 16 and when the car is traversing rough roads the side motion of the body 18 of the car causes these springs to have a longitudinal movement. This tends to shake the occupants of the car unduly and also tends to render steering difficult. With my device the longitudinal movement of the springs is eliminated, since the guide member 12 will play up and down in the socket 9, but will prevent the movement of the springs along their length. The pivoting of the guide member 12 prevents any binding of the latter so that while the springs are free to move up and down they cannot move laterally.

The device is of simple construction and may be readily attached to any car of the type described.

I claim:

1. The combination with a vehicle having an axle and springs disposed in substantially the same plane with the axle, of a guide member secured to said axle and having a bore, a plate secured to the frame of the vehicle above the guide member, a pivot bolt secured to said plate, and a cylindrical guide pin or rod pivotally carried by said pivot bolt, one end of the pin being arranged to slide in the bore in said guide member.

2. The combination with a vehicle having an axle, and springs disposed in substantially the same plane with the axle, of a guide member secured to the axle and having a bore, a plate secured to the frame of the vehicle above the guide member, a central pivot bolt secured to said plate, and a
5 cylindrical guide pin or rod having an opening in one end arranged to fit over said pivot bolt, the opposite end of said guide pin or rod being arranged to slide in the bore in said guide member, and a nut for retaining the guide pin upon the pivot bolt.

MILO WARD MORRIS.

Witnesses:
LOUISE HARTSON,
N. W. MOLLINGER.

Copies of this patent may be obtained for five cents each, by addressing the "Commissioner of Patents, Washington, D. C."